Figure 1:
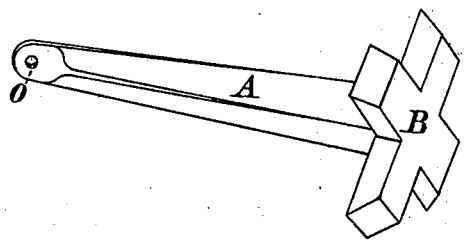

E. N. TWISS.
Anchor for Boats, &c.

No. 202,488. Patented April 16, 1878.

Attest;
Samuel D. Smith
Charles Aiken

Inventor;
Edward Nichols Twiss.

UNITED STATES PATENT OFFICE.

EDWARD NICHOLS TWISS, OF MARBLEHEAD, MASSACHUSETTS.

IMPROVEMENT IN ANCHORS FOR BOATS, &c.

Specification forming part of Letters Patent No. 202,488, dated April 16, 1878; application filed March 21, 1878.

*To all whom it may concern:*

Be it known that I, EDWARD NICHOLS TWISS, of Marblehead, in the county of Essex and State of Massachusetts, have invented a new and useful Improvement in Killicks for Anchoring Boats, Trawls, and Nets, and all purposes for which anchors are used in boat-fishing, which improvement is fully set forth in the following specification, reference being had to the accompanying drawing.

The object of my invention is a killick to anchor boats and all other things requiring anchors with the greatest dexterity, safety, and economy.

My killick is intended to meet the wants of fisherman especially, it being compact, also less liable to become entangled in ropes and lines inboard, and several may be stored in one boat without inconvenience. They do not drag or draw underneath rocks or wrecks or other obstructions on bottoms, as stock-anchors do. It takes instant and fixed hold on the bottom, and requires less cable or line than stock-anchors, and is less liable to be lost from boats by being fouled on the bottom. It is always in position when in use.

My killick is formed by a shank, A, which is joined to four blades, which are straight and at right angles, as seen at B. The smallest end of shank A is flattened, and has a hole, as seen at O. The end of each blade, as seen at B, is beveled to leave edges nearest shank A, as seen in the accompanying drawing. Near the end of the shank is a hole, O, through which to connect it with a cable or equivalent.

The shank A, which connects with the four blades at B, is of sufficient weight to press two corners of blades B, and to instantly fix them on the bottom. The bevels form edges which enable the blades to catch instantly.

The whole is made of cast or other iron in one entire piece.

One killick twelve inches in length, weighing not over twelve pounds, is found to be of sufficient size and weight for all practical purposes for boats' uses.

My killick, made of cast-iron, costs but one-half the price of wrought-iron anchors of the same weight.

I claim as my invention—

A killick provided with four straight blades beveled at their outer ends, and a shank having a hole near its smallest end, through which to connect a cable or its equivalent, substantially as set forth in the specification.

EDWARD NICHOLS TWISS.

Witnesses:
SAMUEL DODD SMITH,
CHARLES AIKEN.